United States Patent
Oh et al.

(10) Patent No.: US 11,535,705 B2
(45) Date of Patent: Dec. 27, 2022

(54) POLYCARBONATE ESTER AND PREPARATION METHOD THEREFOR

(71) Applicant: SK CHEMICALS CO., LTD., Seongnam-si (KR)

(72) Inventors: Kwang Sei Oh, Seoul (KR); Jong-In Lee, Seongnam-si (KR)

(73) Assignee: SK CHEMICALS CO., LTD., Seongnam-si (KR)

(*) Notice: Subject to any disclaimer, the term of this patent is extended or adjusted under 35 U.S.C. 154(b) by 0 days.

(21) Appl. No.: 16/960,615

(22) PCT Filed: Jan. 24, 2019

(86) PCT No.: PCT/KR2019/001039
§ 371 (c)(1),
(2) Date: Jul. 8, 2020

(87) PCT Pub. No.: WO2019/147051
PCT Pub. Date: Aug. 1, 2019

(65) Prior Publication Data
US 2020/0362105 A1    Nov. 19, 2020

(30) Foreign Application Priority Data
Jan. 24, 2018   (KR) .................. 10-2018-0008937

(51) Int. Cl.
*C08G 64/30* (2006.01)

(52) U.S. Cl.
CPC .................. *C08G 64/30* (2013.01)

(58) Field of Classification Search
CPC ........ C08G 64/20; C08G 64/30; C08G 63/64; C08G 63/672; C08G 63/78; C08G 63/785; C08G 64/0208; C08G 64/205; C08G 64/305
See application file for complete search history.

(56) References Cited

U.S. PATENT DOCUMENTS

| | | | | |
|---|---|---|---|---|
| 6,350,848 B1* | 2/2002 | Kinoshita | ............... | B01F 7/043 |
| | | | | 528/196 |
| 9,963,543 B2* | 5/2018 | Oh | .................. | C08G 63/66 |
| 10,738,150 B2* | 8/2020 | Oh | .................. | C08G 63/64 |
| 2010/0081784 A1* | 4/2010 | Brack | ................... | C08G 64/30 |
| | | | | 528/271 |
| 2011/0034646 A1* | 2/2011 | Fuji | ................ | C08G 64/30 |
| | | | | 526/65 |
| 2014/0285888 A1* | 9/2014 | Tanaka | ............. | B29D 11/00644 |
| | | | | 359/489.07 |
| 2015/0141577 A1* | 5/2015 | Namiki | ............... | G02B 1/04 |
| | | | | 525/146 |
| 2015/0247002 A1* | 9/2015 | Uehara | ................... | C07C 43/23 |
| | | | | 528/298 |
| 2015/0259473 A1* | 9/2015 | Streng | ..................... | B01J 19/18 |
| | | | | 528/200 |
| 2016/0152767 A1* | 6/2016 | Oh | ........................ | C08G 63/66 |
| | | | | 528/298 |
| 2020/0216609 A1* | 7/2020 | Oh | ........................ | C08G 63/78 |

FOREIGN PATENT DOCUMENTS

CN      104031249        9/2014
CN      106622083 A      5/2017
(Continued)

OTHER PUBLICATIONS

Written Opinion of the International Searching Authority for Application PCT/KR2019/001039 mailed to Applicant dated Apr. 30, 2019. (Year: 2019).*
Yoon et al "Advanced Polymerization and Properties of Biobased High Tg polyester of Isosorbide and 1,4-Cyclohexanedicarboxylic Acid through in Situ Acetylation", Macromolecules 2013, 46, 2930-2940 (Year: 2013).*
(Continued)

*Primary Examiner* — Frances Tischler
*Assistant Examiner* — Gennadiy Mesh
(74) *Attorney, Agent, or Firm* — Sughrue Mion, PLLC

(57) ABSTRACT

A method for preparing a polycarbonate ester includes feeding a monomer mixture containing (i) at least one compound selected from the group consisting of compounds of the following Formulae 1 and 3; (ii) a compound of the following Formula 2; and (iii) a 1,4:3,6-dianhydrohexitol to a polycondensation reactor and allowing the monomers and the 1,4:3,6-dianhydrohexitol to react to prepare the polycarbontate ester. The prepared polycarbonate ester has improved mechanical properties including tensile strength and impact strength:

Formula 1

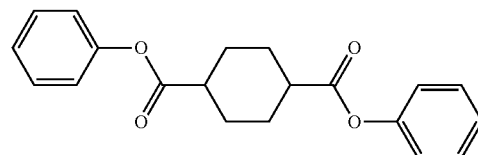

Formula 2

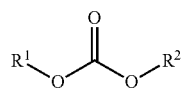

Formula 3

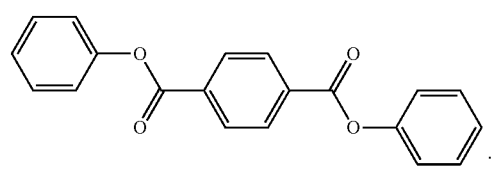

4 Claims, No Drawings

(56) References Cited

FOREIGN PATENT DOCUMENTS

| EP | 3 708 601 A | 9/2020 | |
|---|---|---|---|
| JP | 7-242743 | 9/1995 | |
| KR | 10-1221774 B1 | 1/2013 | |
| KR | 10-2015-0012152 | 2/2015 | |
| KR | 2016-0014644 A | 2/2016 | |
| KR | 10-2016-0090703 | 8/2016 | |
| WO | WO-2011062600 A1 * | 5/2011 | ............. C08G 63/88 |
| WO | WO-2015012619 A1 * | 1/2015 | ........... C08G 63/672 |

OTHER PUBLICATIONS

Hybrid Reactor / Twin Shaft Continuous Reactor by Kurimoto (Year: 2017).*
Feng et al., "A high-molecular-weight and high-Tg poly(ester carbonate) partially based on isosorbide: synthesis and structure-property relationships", Polymer Chemistry, 2015, 6, 633, pp. 633-642.
International search report for PCT/KR2019/001039 dated Apr. 30, 2019.
Long Feng et al., "A high-molecular-weight and high-T$g$ poly(ester carbonate) partially based on isosorbide: synthesis and structure-property relationships", Polym. Chem., 2015, 11 pages.
Feng et al., "A designed synthetic strategy toward poly(isosorbide terephthalate) copolymers: a combination of temporary modification, transesterification, cyclization and polycondensation", Polymer Chemistry, Sep. 2, 2015, 6, 42, pp. 7470-7479 (10 pages).

* cited by examiner

POLYCARBONATE ESTER AND PREPARATION METHOD THEREFOR

CROSS-REFERENCE TO RELATED APPLICATIONS

This application is a National Stage of International Application No. PCT/KR2019/001039 filed on Jan. 24, 2019, which claims priority under U.S.C. § 119(a) to Koran Patent Application No. 10-2018-0008937 filed on Jan. 24, 2018, the disclosure of which is incorporated herein in its entirety by reference.

TECHNICAL FIELD

The present invention relates to a bio-based polycarbonate ester and a process for preparing the same. In more detail, the present invention relates to a process for preparing a bio-based polycarbonate ester that is excellent in such mechanical properties as tensile strength and impact strength by using a high-viscosity polycondensation reactor.

BACKGROUND ART

A bio-based polycarbonate ester prepared by melt-polycondensation of 1,4:3,6-dianhydrohexitol with a carbonate or a dicarboxylate is a bioplastic that contains a bio-based monomer derived from a bio-source. The bio-based polycarbonate ester has high transparency of PMMA (poly(methyl methacrylate)), which is a representative transparent general-purpose resin, and high heat resistance of bisphenol A (BPA) polycarbonate. In particular, in the case where 1,4:3,6-dianhydrohexitol is used as a monomer for preparing a polycarbonate, which is one of the representative transparent engineering plastics, the polycarbonate thus prepared has high heat resistance and transparency, as well as excellent surface hardness, UV stability, flame retardancy, and chemical resistance, along with the advantages of a bioplastic.

In addition, it is possible to enhance the ductility of the molecular structure of 1,4:3,6-dianhydrohexitol by copolymerizing a 1,4-cyclohexanedicarboxylate monomer having an aliphatic ring molecular structure. It is also possible to compensate for the disadvantage of a carbonate bond by replacing some of the carbonate bonds with an ester bond.

However, despite its merits in terms of physical properties by virtue of its unique molecular structure, 1,4:3,6-dianhydrohexitol has the disadvantage that it is easily discolored at high temperatures due to its relatively low oxidation stability. Thus, if 1,4:3,6-dianhydrohexitol is used in a melt-polycondensation process at high temperatures, the transparency of the product is deteriorated due to the discoloration of 1,4:3,6-dianhydrohexitol. In addition, if a low-viscosity polymerization apparatus such as a conventional vertical stirring reactor is used, the melt viscosity of the polymer is increased as the amount of 1,4:3,6-dianhydrohexitol used increases. Since it is difficult to produce products having various polymerization degrees, the commercial applications thereof have been restricted. Consequently, in order to produce a product of high transparency and high strength while maintaining the inherent characteristics of 1,4:3,6-dianhydrohexitol, it is necessary to secure a polymerization facility and a process for preparing a bio-based polycarbonate ester having a high polymerization degree at low temperatures for preventing the discoloration of 1,4:3,6-dianhydrohexitol.

Meanwhile, the commercial process of preparing a polycarbonate may be divided into a phosgene process and a non-phosgene melt-polycondensation process. Unlike the phosgene process in which phosgene is used as a source material for a carbonate, diphenyl carbonate (hereinafter referred to as DPC) is used in the non-phosgene melt-polycondensation process.

The non-phosgene melt-polycondensation process of a BPA polycarbonate uses BPA as a diol and DPC as a carbonate, and the transesterification reaction of BPA and DPC produces phenol as a byproduct of the melt polycondensation (see Korean Laid-open Patent Publication No. 2016-0014644 and Korean Patent No. 10-1221774) In addition, the non-phosgene melt-polycondensation process of a BPA polycarbonate is typically carried out in a vertical stirring reactor, a horizontal screw reactor, a thin film evaporation reactor, a wire-wetting fall reactor, or the like. However, a BPA polycarbonate produced by the non-phosgene melt-polycondensation at high temperatures has various disadvantages such as discoloration, deterioration of physical properties, inability to produce products having various polymerization degrees, and high production costs. Therefore, there is a demand for a facility and a process for preparing a bio-based polycarbonate ester on a commercial scale, which can deal with the disadvantages as described above.

DISCLOSURE OF INVENTION

Technical Problem

Accordingly, an object of the present invention is to provide a bio-based polycarbonate ester that is excellent in such mechanical properties as tensile strength and impact strength by using a high-viscosity polycondensation reactor, which is capable of attaining a high polymerization degree at low temperatures while preventing discoloration and deterioration of the physical properties of 1,4:3,6-dianhydrohexitol.

Solution to Problem

In order to achieve the above object, the present invention provides a process for preparing a bio-based polycarbonate ester, which comprises feeding a monomer mixture that comprises at least one compound selected from the group consisting of compounds represented by the following Formulae 1 to 3; and 1,4:3,6-dianhydrohexitol to a high-viscosity polycondensation reactor; and reacting them.

[Formula 1]

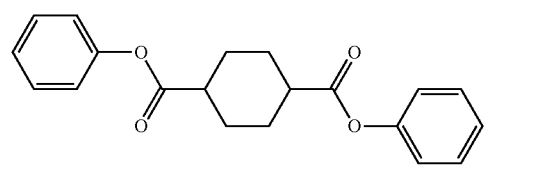

[Formula 2]

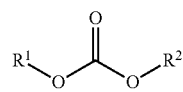

[Formula 3]

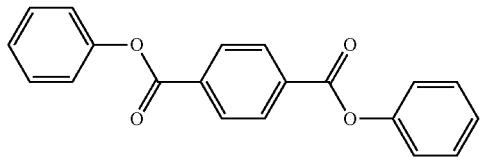

in the above Formula 2,

R¹ and R² are each an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent. In such event, the ester substituent may be an alkyl ester having 1 to 18 carbon atoms, a cycloalkyl ester having 4 to 20 carbon atoms, or an aryl ester having 6 to 18 carbon atoms.

In addition, the present invention provides a bio-based polycarbonate ester prepared by the above-described preparation process and having an intrinsic viscosity (IV) of 0.8 to 2.3 dl/g.

Further, the present invention provides a molded article, which comprises the bio-based polycarbonate ester.

Advantageous Effects of Invention

The bio-based polycarbonate ester of the present invention is excellent in such mechanical properties as tensile strength and impact strength and is environmentally friendly since it is free from bisphenols.

In addition, the process for preparing a bio-based polycarbonate ester of the present invention that uses a high-viscosity polycondensation reactor is capable of preventing discoloration and deterioration of the physical properties of 1,4:3,6-dianhydrohexitol, producing products having various polymerization degrees, and reducing the production costs.

BEST MODE FOR CARRYING OUT THE INVENTION

Process for Preparing a Bio-Based Polycarbonate Ester

The present invention provides a process for preparing a bio-based polycarbonate ester, which comprises feeding a monomer mixture that comprises at least one compound selected from the group consisting of compounds represented by the following Formulae 1 to 3; and 1,4:3,6-dianhydrohexitol to a high-viscosity polycondensation reactor and reacting them:

[Formula 1]

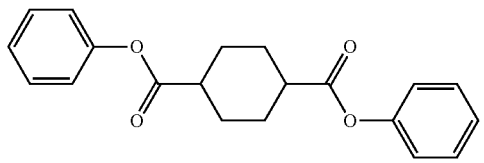

[Formula 2]

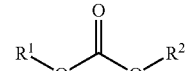

[Formula 3]

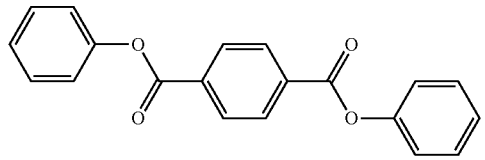

in the above Formula 2,

R¹ and R² are each an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent. In such event, the ester substituent may be an alkyl ester having 1 to 18 carbon atoms, a cycloalkyl ester having 4 to 20 carbon atoms, or an aryl ester having 6 to 18 carbon atoms.

Monomer Mixture

The monomer mixture comprises at least one compound selected from the group consisting of compounds represented by the following Formulae 1 to 3; and 1,4:3,6-dianhydrohexitol.

1,4:3,6-dianhydrohexitol may be at least one selected from the group consisting of isomannide, isosorbide, or isoidide. Specifically, it may be isosorbide.

The cis/trans ratio of 1,4-diphenyl-cyclohexanedicarboxylate (DPCD), which is a compound represented by the above Formula 1, may be 1/99 to 99/1%, 10/90 to 90/10%, or 20/80 to 80/20%.

The compound represented by the above Formula 2 may be dimethyl carbonate, diethyl carbonate, di-t-butyl carbonate, diphenyl carbonate, ditolyl carbonate, or bis(methyl salicyl) carbonate. Specifically, since the reaction is carried out under reduced pressures, diphenyl carbonate or substituted diphenyl carbonate may be used as the compound represented by the above Formula 2. The substituted diphenyl carbonate may be ditolyl carbonate or bis(methyl salicyl) carbonate.

The monomer mixture may comprise compounds represented by the following Formulae 1 and 2; and 1,4:3,6-dianhydrohexitol. Specifically, the total amounts of the compound represented by the above Formula 1 and the compound represented by the above Formula 2 may be 0.7 to 1.3 moles, 0.9 to 1.1 moles, or 0.95 to 1.05 mole, based on 1 mole of 1,4:3,6-dianhydrohexitol.

If the monomer mixture comprises 1,4:3,6-dianhydrohexitol and the compounds represented by the above Formulae 1 and 2, the bio-based polycarbonate ester thus produced may contain repeat unit 1 represented by the following Formula 4 and repeat unit 2 represented by the following formula 5.

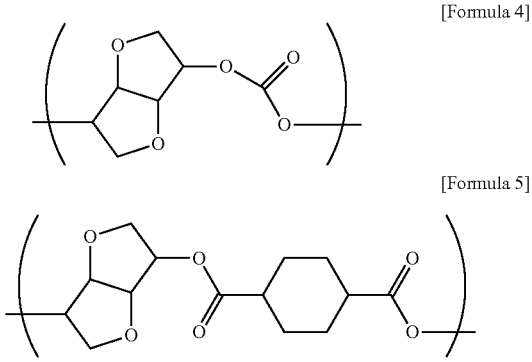

[Formula 4]

[Formula 5]

Specifically, the repeat unit 1 may be obtained from the reaction of 1,4:3,6-dianhydrohexitol and a carbonate-based compound represented by the above Formula 2, and the repeat unit 2 may be obtained from the reaction of 1,4:3,6-dianhydrohexitol and 1,4-cyclohexanedicarboxylate. That is, 1,4:3,6-dianhydrohexitol and the compound represented by the above Formula 2 may be reacted to form a carbonate bond (repeat unit 1, Formula 4), and 1,4:3,6-dianhydrohexitol and the compound represented by the above Formula 1 may be reacted to form an ester bond (repeat unit 2, Formula 5).

In addition, the cis/trans ratio of 1,4-cyclohexanedicarboxylate in the repeat unit 2 represented by the above Formula 5 may be 1/99 to 99/1%, 20/80 to 80/20%, or 30/70 to 70/30%.

Meanwhile, the monomer mixture may comprise compounds represented by Formulae 2 and 3; and 1,4:3,6-dianhydrohexitol, wherein the compound represented by the above Formula 3 is diphenyl terephthalate (DPT). Specifically, the total amounts of the compound represented by the above Formula 2 and the compound represented by the above Formula 3 may be 0.7 to 1.3 moles, 0.9 to 1.1 moles, or 0.95 to 1.05 mole, based on 1 mole of 1,4:3,6-dianhydrohexitol.

If the monomer mixture comprises 1,4:3,6-dianhydrohexitol and the compounds represented by the above Formulae 2 and 3, the bio-based polycarbonate ester thus produced may contain repeat unit 1 represented by the above Formula 4 and repeat unit 3 represented by the following formula 6.

[Formula 6]

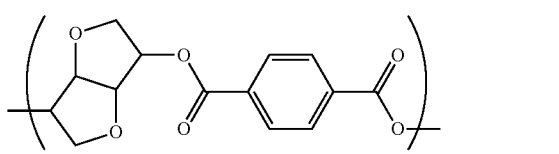

Specifically, the repeat unit 1 may be obtained from the reaction of 1,4:3,6-dianhydrohexitol and a carbonate compound represented by the above Formula 2, and the repeat unit 3 may be obtained from the reaction of 1,4:3,6-dianhydrohexitol and a terephthalate. That is, 1,4:3,6-dianhydrohexitol and the compound represented by the above Formula 2 may be reacted to form a carbonate bond (repeat unit 1, Formula 4), and 1,4:3,6-dianhydrohexitol and the compound represented by the above Formula 3 may be reacted to form an ester bond (repeat unit 3, Formula 6).

In addition, the monomer mixture may comprise compounds represented by the following Formulae 1 to 3; and 1,4:3,6-dianhydrohexitol. Specifically, the total amounts of the compound represented by the above Formula 1, the compound represented by the above Formula 2, and the compound represented by the above Formula 3 may be 0.7 to 1.3 moles, 0.9 to 1.1 moles, or 0.95 to 1.05 mole, based on 1 mole of 1,4:3,6-dianhydrohexitol.

If the monomer mixture comprises 1,4:3,6-dianhydrohexitol and the compounds represented by the above Formulae 1 to 3, the bio-based polycarbonate ester thus produced may contain repeat unit 1 represented by the following Formula 4, repeat unit 2 represented by the following Formula 5, and repeat unit 3 represented by the following formula 6.

Specifically, the repeat unit 1 may be obtained from the reaction of 1,4:3,6-dianhydrohexitol and a carbonate compound represented by the above Formula 2, the repeat unit 2 may be obtained from the reaction of 1,4:3,6-dianhydrohexitol and 1,4-cyclohexanedicarboxylate, and the repeat unit 3 may be obtained from the reaction of 1,4:3,6-dianhydrohexitol and a terephthalate. That is, 1,4:3,6-dianhydrohexitol and the compound represented by the above Formula 2 may be reacted to form a carbonate bond (repeat unit 1, Formula 4), 1,4:3,6-dianhydrohexitol and the compound represented by the above Formula 1 may be reacted to form an ester bond (repeat unit 2, Formula 5), and 1,4:3,6-dianhydrohexitol and the compound represented by the above Formula 3 may be reacted to form an ester bond (repeat unit 3, Formula 6).

Additives and Additional Monomers

The monomer mixture may further comprise such additives as a catalyst and a stabilizer, and at least one monomer selected from the group consisting of an additional diol compound other than 1,4:3,6-dianhydrohexitol and an additional ester compound other than the compounds represented by the above Formulae 1 to 3.

The monomer mixture may further comprise a catalyst for enhancing the reactivity of the reaction. In addition, the catalyst may be added to the reaction step at any time, but it is preferably added before the reaction.

Any alkali metal and/or alkali earth metal catalyst commonly used in a polycarbonate melt-polycondensation reaction may be used as the catalyst. In addition, an oxide, hydride, amide, or phenolate of an alkali metal and/or an alkaline earth metal may be used as the catalyst.

Examples of the alkali metal catalysts may include lithium hydroxide (LiOH), sodium hydroxide (NaOH), potassium hydroxide (KOH), cesium hydroxide (CsOH), lithium carbonate ($Li_2CO_3$), sodium carbonate ($Na_2CO_3$), potassium carbonate ($K_2CO_3$), cesium carbonate ($Cs_2CO_3$), lithium acetate (LiOAc), sodium acetate (NaOAc), potassium acetate (KOAc), cesium acetate (CsOAc), and the like.

Examples of the alkali earth metal catalysts may include calcium hydroxide ($Ca(OH)_2$), barium hydroxide ($Ba(OH)_2$), magnesium hydroxide ($Mg(OH)_2$), strontium hydroxide ($Sr(OH)_2$), calcium carbonate ($CaCO_3$), barium carbonate ($BaCO_3$), magnesium carbonate ($MgCO_3$), strontium carbonate ($SrCO_3$), calcium acetate ($Ca(OAc)_2$), barium acetate ($Ba(OAc)_2$), magnesium acetate ($Mg(OAc)_2$), strontium acetate ($Sr(OAc)_2$), and the like.

Examples of the oxide, hydride, amide, or phenolate of an alkali metal and/or an alkaline earth metal may include magnesium oxide (MgO), barium oxide (BaO), sodium aluminate ($NaAlO_2$), zinc oxide (ZnO), lead oxide (PbO), dibutyltin oxide (($C_4H_9)_2SnO$), antimony trioxide ($Sb_2O_3$), and the like.

The catalyst may be used in an amount such that the metal equivalent of the catalyst is greater than 0 to 5 mmoles, greater than 0 to 3 mmoles, or greater than 0 to 1 mmole, based on 1 mole of the entire diol compounds. If the amount of the catalyst is within the above range, it is possible to prevent the problems that the degree of polymerization falls below the target degree of polymerization and that a side reaction takes place whereby such target physical properties as transparency are nor satisfied.

Meanwhile, the alkali metal and/or alkali earth metal catalyst may be used in combination with a basic catalyst such as a basic ammonium or amine, a basic phosphorous, or a basic boron compound. The basic catalyst may be used alone or in combination, and the amount thereof is not particularly limited.

The monomer mixture may further comprise an additional diol compound other than 1,4:3,6-dianhydrohexitol, depending on the target properties. Specifically, the additional diol compound may have a single aliphatic ring or a condensed heterogeneous ring at the center of the molecule in order to enhance the heat resistance, transparency, UV stability, and weatherability of the bio-based polycarbonate ester thus prepared. Meanwhile, when the hydroxyl groups are in a symmetrical structure, the ring size and heat resistance proportionally increase. On the other hand, the optical characteristics do not depend on the ring size and the positions of the hydroxyl groups, but they vary with the characteristics of each raw material. As the ring size is bigger, it is more difficult to commercially produce and utilize the diol compound.

The additional diol compound may be a primary, secondary, or tertiary diol compound. Specifically, the additional diol compound may be at least one diol compound selected from the group consisting of 1,2-cyclohexanedimethanol, 1,3-cyclohexanedimethanol, 1,4-cyclohexanedimethanol, tricyclodecanedimethanol, pentacyclopentadecanedimethanol, decalindimethanol, tricyclotetradecanedimethanol, norbornanedimethanol, adamantanedimethanol, 3,9-bis(1,1-dimethyl-2-hydroxyethyl)-2,4,8,10-tetraoxaspiro[5,5]undecane, bicycle[2.2.2]octane-2,3-dimethanol, 2,4:3,5-di-o-methylene-D-mannitol, tetrahydro-2,5-furandimethanol, 2,5-furandimethanol, 5,5'-(1-methylethylidene)bis(2-furanmethanol), 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbornanediol, adamantanediol, 2,2-bis(4-hydroxycyclohexyl)propane, and 2,2,4,4-tetramethyl-1,3-cyclobutanediol.

More specifically, the additional diol compound may be 1,4-cyclohexanedimethanol, tetrahydrofuran-2,5-dimethanol, 2,5-furandimethanol, 2,2-bis(4-hydroxycyclohexyl)propane, or 2,2,4,4-tetramethyl-1,3-cyclobutanediol.

When the molar amount of the additional diol compound employed is p, the molar amount of 1.4:3,6-dianhydrohexitol employed is to be 1−p. In particular, if the additional diol compound is a petrochemical-based diol compound, it may be used in an amount such that the bio-based carbon content (ASTM-D6866) in the final polymer derived from 1,4:3,6-dianhydrohexitol is at least 1% by mole. In such event, p may satisfy 0≤p<0.99 mole. That is, the additional diol compound may be used in an amount of less than 0.99 mole based on 1 mole of 1,4:3,6-dianhydrohexitol.

The monomer mixture may further comprise an additional ester compound other than the compounds represented by the above Formulae 1 to 3, which are ester-bond monomers in the polymer chain, depending on the target properties.

The additional ester compound may be diphenyl ester. In addition, the additional ester compound may be prepared by reacting a primary, secondary, or tertiary dicarboxylate or dicarboxylic acid (hereinafter referred to as an additional dicarboxylate or dicarboxylic acid) with phenol or a phenol substituent. Specifically, the additional ester compound may be prepared by reacting an additional dicarboxylate or dicarboxylic acid having a single aliphatic ring or a condensed heterogeneous ring at the center of the molecule with phenol or a phenol substituent in order to enhance the heat resistance, transparency, UV stability, and weatherability of the bio-based polycarbonate ester thus prepared.

Specifically, the additional ester compound may be at least one selected from the group consisting of 1,2-diphenyl-cyclohexanedicarboxylate, 1,3-diphenyl-cyclohexanedicarboxylate, diphenyl decahydro-1,4-naphthalenedicarboxylate, diphenyl decahydro-1,5-naphthalenedicarboxylate, diphenyl decahydro-2,4-naphthalenedicarboxylate, diphenyl decahydro-2,5-naphthalenedicarboxylate, diphenyl decahydro-2,6-naphthalenedicarboxylate, diphenyl decahydro-2,7-naphthalenedicarboxylate, diphenyl decahydro-2,8-naphthalenedicarboxylate, diphenyl tetrahydro-2,5-furanedicarboxylate, diphenyl 2,5-furanedicarboxylate, diphenyl phthalate, and diphenyl isophthalate.

More specifically, the additional ester compound may be 1,3-diphenyl-cyclohexanedicarboxylate, diphenyl decahydro-2,6-naphthalenedicarboxylate, diphenyl tetrahydro-2,5-furanedicarboxylate, diphenyl 2,5-furanedicarboxylate or diphenyl isophthalate.

The phenol substituent used in the preparation of the additional ester compound may be a compound represented by the following Formula 7.

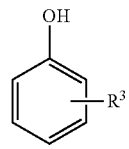

[Formula 7]

In the above Formula 7, $R^3$ is at least one selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, or an ester substituent. In such event, the ester substituent may be an alkyl ester having 1 to 18 carbon atoms, a cycloalkyl ester having 4 to 20 carbon atoms, or an aryl ester having 6 to 18 carbon atoms.

When the molar amount of the additional ester compound employed is q, the molar amount of the compounds represented by the above Formulae 1 to 3 employed is to be 1−q. In such event, q may satisfy 0≤q<1 mole. That is, the additional ester compound may be used in an amount of less than 1 mole based on 1 mole of the entire carbonate and/or ester compounds.

In addition, the monomer mixture may further comprise an additive such as an antioxidant, a heat stabilizer, a light absorber, a color former, a lubricant, a colorant, a conductive agent, a nucleation agent, a flame retardant, a plasticizer, an antistatic agent, and the like.

For example, the antioxidant may be hindered phenol, hydroquinone, phosphite, a substituted compound thereof, or the like. In addition, the light absorber may be resorcinol, salicylate, or the like. Further, the color former may be phosphite, hydrophosphite, or the like. The lubricant may be montanic acid, stearyl alcohol, or the like. In addition, a dye and a pigment may be used as the colorant. Carbon black may be used as the conductive agent or the nucleation agent.

In such event, the kinds and amounts of all of the above-mentioned additives are not particularly limited as long as they do not adversely affect the physical properties, especially transparency, of the bio-based polycarbonate esters thus prepared.

High-Viscosity Polycondensation Reactor

The molecular structure of BPA, which contains an aromatic ring, reduces the free volume of a polymer chain, whereas 1,4:3,6-dianhydrohexitol, which contains a rigid condensation heterogeneous ring, increases the free volume of a polymer chain. Thus, as compared with the polycondensation process of a BPA polycarbonate, which requires a high reaction temperature due to its high melt viscosity for the same heat resistance composition, it is more advantageous to employ a horizontal-type high-viscosity polycondensation reactor for the melt-polycondensation process of a bio-based polycarbonate ester, which can be carried out at a low reaction temperature due to its low melting point. In addition, since the melt-polycondensation reaction for a bio-based polycarbonate ester can be carried out at a relatively low-temperature range, it is possible to prevent discoloration and deterioration of the physical properties of the product. Further, it is possible to produce a product having a high polymerization degree without chain breakage that may be caused by the high shear force induced by the high agitation force applied in the melt-polycondensation process of a BPA polycarbonate carried out in a conventional low-viscosity polycondensation reactor that operates at high reaction temperatures.

The high-viscosity polycondensation reactor may be a horizontal plug flow reactor. Specifically, the high-viscosity polycondensation reactor may be an extruder, a kneader, or a finisher reactor that comprises one or more stirrers.

The stirrer may comprise a shaft and a screw or may be in the form of a shaft-free. In addition, the screw of the stirrer shaft may be in the form of a spiral, a lattice, a bar, a spectacle, or the like. Specifically, it may be in the form of a bar.

The high-viscosity polycondensation reactor may comprise such accessory equipment as a discharge screw for discharging the final molten polymer, a vapor column for collecting phenol as a reaction byproduct, a cooling trap, and a receiver. In addition, in the high-viscosity polycondensation reactor, the molten polymer discharged through the discharge screw is conveyed to a pelletizer to produce pellets, which may be dried and packaged.

The maximum viscosity in the high-viscosity polycondensation reactor may be 10,000 to 1,000,000 poises. Specifically, the maximum viscosity in the high-viscosity polycondensation reactor may be 20,000 to 500,000 poises or 50,000 to 200,000 poises. If the maximum viscosity in the high-viscosity polycondensation reactor is within the above range, it is easy to achieve a high polymerization degree at low reaction temperatures.

The preparation process may be carried out with temperature elevation and depressurization in a stepwise manner in order to rapidly remove byproducts from the molten reactants having a high viscosity and to expedite the polymerization reaction.

Specifically, the preparation process may comprise (1) melting the monomer mixture and reacting the mixture at a reduced pressure to prepare a prepolymer; and (2) reacting the prepolymer at a reduced pressure to prepare a bio-based polycarbonate ester.

Step (1)

In this step, the monomer mixture is melted and reacted at a reduced pressure to prepare a prepolymer.

This step may be carried out in a reactor that comprises such accessory equipment as a vacuum pump for depressurization, a vapor column for collecting phenol as a reaction byproduct, a cooling trap, and a receiver.

The prepolymer may have an intrinsic viscosity (IV) of 0.10 to 0.60 dl/g. Specifically, the prepolymer may have an intrinsic viscosity (IV) of 0.20 to 0.55 dl/g or 0.30 to 0.50 dl/g.

Specifically, this step may be carried out at 20 to 700 mbar and 140 to 220° C.

Specifically, this step may comprise (i) melting the monomer mixture, followed by raising the temperature to 140 to 180° C. and reducing the pressure to 300 to 700 mbar; and (ii) raising the temperature to 180 to 220° C. and reducing the pressure to 20 to 300 mbar. More specifically, this step may comprise (i) melting the monomer mixture, followed by raising the temperature to 150 to 180° C. or 160 to 180° C., and reducing the pressure to 300 to 650 mbar or 300 to 600 mbar; and (ii) raising the temperature to 190 to 220° C. or 200 to 220° C., and reducing the pressure to 20 to 250 mbar or 20 to 200 mbar.

Step (2)

In this step, the prepolymer is reacted at a reduced pressure to prepare a bio-based polycarbonate ester.

Specifically, this step may be carried out at 0.1 to 20 mbar and 220 to 270° C.

Specifically, this step may comprise (i) raising the temperature of the prepolymer to 220 to 240° C. and reducing the pressure to 5 to 20 mbar; and (ii) raising the temperature to 240 to 270° C. and reducing the pressure to 0.1 to 5 mbar. Specifically, this step may comprise (i) raising the temperature of the prepolymer to 220 to 240° C. and reducing the pressure to 5 to 15 mbar or 5 to 10 mbar; and (ii) raising the temperature to 240 to 270° C. and reducing the pressure to 0.1 to 3 mbar or 0.1 to 1 mbar.

The rate of temperature elevation in this step may be 0.1 to 10° C./min, 0.2 to 5° C./min, or 0.5 to 2° C./min. In addition, the reaction time may be 1 to 10 hours or 3 to 8 hours.

Meanwhile, phenol may be produced as a reaction byproduct while the melt-polycondensation reaction is carried out. It is preferable that phenol produced as a byproduct is removed from the reaction system in order to shift the reaction equilibrium towards the production of the polycarbonate ester. If the rate of temperature elevation in the melt-polycondensation reaction is within the above ranges, it is possible to prevent the problem that phenol, a reaction byproduct, evaporates or sublimes together with the reaction raw materials.

In addition, the process for preparing a bio-based polycarbonate ester may be a batch or continuous process. Specifically, the above steps (1) and (2) may be carried out in the same reactor or may be carried out in different reactors, respectively.

If the above steps (1) and (2) are carried out in different reactors, the above step (1) may be carried out in a reactor that may be used in the conventional process for producing a BPA polycarbonate on a commercial scale such as a vertical stirring reactor, a thin film evaporation reactor, a wire-wetting fall reactor, or the like. Thereafter, the prepolymer prepared in the above step (1) is continuously fed to a high-viscosity polycondensation reactor in which the above step (2) is carried. The feeding rate to the high-viscosity polycondensation reactor may be varied depending on the molecular weight of the prepolymer prepared.

In addition, if the above steps (1) and (2) are carried out in the same reactor, the reactor may be a high-viscosity polycondensation reactor.

Bio-Based Polycarbonate Ester

The present invention provides a bio-based polycarbonate ester prepared by the above-described preparation process and having an intrinsic viscosity (IV) of 0.8 to 2.3 dl/g.

Specifically, the bio-based polycarbonate ester may have an intrinsic viscosity (IV) of 0.8 to 2.0 dl/g, 0.8 to 1.7 dl/g, or 0.8 to 1.4 dl/g.

A specimen injection-molded according to the ASTM D638 test method from the bio-based polycarbonate ester may have a tensile strength of 80 to 200 MPa and a flexural strength of 100 to 210 MPa. Specifically, the specimen may have a tensile strength of 80 to 190 MPa, 80 to 180 MPa, or 80 to 170 MPa, and a flexural strength of 100 to 200 MPa, 100 to 190 MPa, or 100 to 180 MPa.

The bio-based polycarbonate ester may have an Izod notch impact strength of 60 J/m to no breakage (NB). Specifically, the bio-based polycarbonate ester may have an Izod notch impact strength of 70 J/m to no breakage (NB), 80 J/m to no breakage (NB), or 90 J/m to no breakage (NB). Here, no breakage indicates that the specimen does not break since it has an impact strength exceeding the measurement limit of the impact tester.

Molded Article

Further, the present invention provides a molded article that comprises a bio-based polycarbonate ester. Specifically, the molded article may be produced by molding a bio-based polycarbonate ester.

The molding method is not particularly limited. For example, injection molding, extrusion molding, blow molding, extrusion blow molding, inflation molding, calender molding, foam molding, balloon molding, vacuum molding, and radiation molding may be adopted.

The use of the molded article is not particularly limited. It may be used as a substitute for conventional heat resistant and optical articles by virtue of its excellent heat resistance and transparency. Specifically, the molded article may be an automobile part, an electric/electronic part, a lighting part, a medical product, a display part, an aviation part, a machine part, and a food container.

Mode for the Invention

Hereinafter, the present invention is described in more detail by the following examples and comparative examples. However, these examples are provided only for illustration purposes, and the present invention is not limited thereto.

EXAMPLE

Preparation of a High-Viscosity, Bio-Based Polycarbonate Ester

Example 1

A 12-liter twin-screw batch kneader reactor (CKR10B-170, LIST Corp.) was used as a high-viscosity polycondensation reactor. The reactor was charged with 3,204 g (21.92 moles) of isosorbide (ISB, Roquette Freres), 710 g (2.19 moles) of 1,4-diphenyl-cyclohexanedicarboxylate (DPCD, SK Chemicals), 4,215 g (19.68 moles) of diphenyl carbonate (DPC, Changfeng), and 2.87 g of a 1% aqueous solution of sodium aluminate ($NaAlO_2$) at room temperature. Thereafter, the temperature was raised to 150° C. Once the temperature reached 150° C., the pressure was reduced to 500 mbar, and the temperature was then raised to 190° C. over 1 hour. During the temperature elevation, phenol began to be generated as a reaction byproduct. When the temperature reached 190° C., the pressure was reduced to 100 mbar and maintained for 20 minutes, and then the temperature was raised to 230° C., over 20 minutes. Once the temperature reached 230° C., the pressure was reduced to 10 mbar, and then the temperature was raised to 250° C. over 10 minutes. Once the temperature reached 250° C., the pressure was reduced to 1 mbar or less, and the reaction continued until the maximum hydraulic pressure of 48 bar was reached. Thereafter, the reaction was terminated, and the product was cooled to room temperature to obtain a solid sample.

The polycarbonate ester thus prepared had a Tg of 160° C., an IV of 1.05 dl/g, a number average molecular weight (Mn) of 40,857 g/mole, and a weight average molecular weight (Mw) of 100,952 g/mole as measured by gel permeation chromatography (GPC).

Example 2

The same procedures as Example 1 were repeated to prepare a polycarbonate ester, except that 3,204 g (21.92 mol) of ISB, 1,421 g (4.38 mol) of DPCD, and 3,747 g (17.49 mol) of DPC were used.

Example 3

The same procedures as Example 1 were repeated to prepare a polycarbonate ester, except that 3,204 g (21.92 mol) of ISB, 2,131 g (6.57 mol) of DPCD, and 3,278 g (15.30 mol) of DPC were used.

Example 4

The same procedures as Example 1 were repeated to prepare a polycarbonate ester, except that 3,204 g (21.92 mol) of ISB, 2,842 g (8.76 mol) of DPCD, and 2,808 g (13.11 mol) of DPC were used.

Example 5

The same procedures as Example 1 were repeated to prepare a polycarbonate ester, except that 3,204 g (21.92 mol) of ISB, 443 g (10.95 mol) of DPCD, and 2,339 g (10.92 mol) of DPC were used.

Example 6

The same procedures as Example 1 were repeated to prepare a polycarbonate ester, except that 3.204 g (21.92 mol) of ISB, 697 g (2.19 mol) of DPT (SK Chemicals), and 4,215 g (19.68 mol) of DPC were used.

Example 7

The same procedures as Example 1 were repeated to prepare a polycarbonate ester, except that 3,204 g (21.92 mol) of ISB, 710 g (2.19 mol) of DPCD, 697 g (2.19 mol) of DPT, and 3,747 g (17.49 mol) of DPC were used.

Comparative Example

Preparation of a Low-Viscosity, Bio-Based Polycarbonate Ester

Comparative Example 1

17-liter polycondensation bench reactor was charged with 1,995 g (13.65 moles) of ISB, 443 g (1.37 moles) of DPCD, 2.632 g (12.29 moles) of DPC, and 1.80 g of a 1% aqueous solution of $NaAlO_2$ at room temperature. Thereafter, the temperature was raised to 150° C. Once the temperature reached 150° C., the pressure was reduced to 400 torr, and the temperature was then raised to 190° C. over 1 hour. During the temperature elevation, phenol began to be generated as a reaction byproduct. When the temperature reached 190° C., the pressure was reduced to 100 torr and maintained for 20 minutes, and then the temperature was raised to 230° C. over 20 minutes. Once the temperature reached 230° C., the pressure was reduced to 10 torr, and then the temperature was raised to 250° C. over 10 minutes. Once the temperature reached 250° C., the pressure was reduced to 1 torr or less, and the reaction continued until the target stirring torque was reached. Upon arrival at the target stirring torque, the reaction was terminated. The polymerized product pressurized and discharged was rapidly cooled in a water bath and then cut into pellets.

The polycarbonate ester thus prepared had a Tg of 160° C., an IV of 0.55 dl/g, an Mn of 17,309 g/mole, and an Mw of 36,368 g/mole as measured by GPC.

Comparative Example 2

The same procedures as Comparative Example 1 were repeated, except that 1,995 g (13.65 mol) of ISB, 889 g (2.74 mol) of DPCD, and 2.339 g (10.92 mol) of DPC were used Test Example The bio-based polycarbonate esters of Examples 1 to 7 and Comparative Examples 1 and 2 were each evaluated for their physical properties by the following methods. The measured physical properties are shown in Table 1 below.

(1) Measurement of Glass Transition Temperature (Tg)

The glass transition temperature was measured using a differential scanning calorimeter (Q20, TA instruments) in accordance with ASTM D3418.

(2) Measurement of Intrinsic Viscosity (IV)

A sample was dissolved in o-chlorophenol at a concentration of 1.2 g/dl at 150° C. for 15 minutes. The intrinsic viscosity of the sample was measured in a thermostat at 35° C. using an Ubbelodhe viscometer.

(3) Measurement of Tensile Strength

A specimen prepared according to ASTM D638 was subjected to a measurement using a universal testing machine (Z010, Zwick Roell).

(4) Measurement of Flexural Strength and Flexural Modules

A specimen prepared according to ASTM D638 was subjected to a measurement using a universal testing machine (4465, Instron).

(5) Measurement of Izod Impact Strength

A specimen prepared according to ASTM D256 was subjected to a measurement for Izod impact strength using an impact tester (258-PC-S, Yasuda).

(6) Measurement of Heat Distortion Temperature (HDT)

A specimen prepared according to ASTM D648 was subjected to a measurement for heat distortion temperature using a heat distortion temperature testing machine (6M-2, Toyoseiki).

(7) Measurement of Pencil Hardness

A specimen prepared according to KS M ISO15184 was subjected to a measurement for pencil hardness using a pencil hardness testing machine (VF2377-123, TQC).

TABLE 1

| | Ex. 1 | Ex. 2 | Ex. 3 | Ex. 4 | Ex. 5 | Ex. 6 | Ex. 7 | C. Ex. 1 | C. Ex. 2 |
|---|---|---|---|---|---|---|---|---|---|
| ISB | 1 | 1 | 1 | 1 | 1 | 1 | 1 | 1 | 1 |
| DPC | 0.9 | 0.8 | 0.7 | 0.6 | 0.5 | 0.9 | 0.8 | 0.9 | 0.8 |
| DPCD | 0.1 | 0.2 | 0.3 | 0.4 | 0.5 | — | 0.1 | 0.1 | 0.2 |
| DPT | — | — | — | — | — | 0.1 | 0.1 | — | — |
| IV (dl/g) | 1.05 | 1.10 | 1.14 | 1.19 | 1.17 | 1.01 | 1.07 | 0.55 | 0.58 |
| Tg (° C.) | 160 | 157 | 154 | 151 | 148 | 170 | 168 | 160 | 157 |
| Tensile strength (MPa) | 91 | 97 | 103 | 106 | 111 | 95 | 102 | 77 | 79 |
| Flexural strength (MPa) | 170 | 165 | 158 | 152 | 148 | 174 | 168 | 152 | 131 |
| Flexural modulus (MPa) | 3,486 | 3,361 | 3,254 | 3,138 | 3,031 | 3,512 | 3,423 | 3,062 | 2,936 |
| Izod impact strength (J/m) | 94 | 258 | 779 | NB | NB | 102 | 242 | 12 | 37 |
| Heat distortion temperature (° C.) | 138 | 135 | 131 | 129 | 127 | 147 | 145 | 131 | 127 |
| Pencil hardness | 3H | 3H | 2H | 2H | 2H | 3H | 3H | 2H | H |

As shown in Table 1, the bio-based polycarbonate esters of Examples 1 to 7 prepared by using the high-viscosity polycondensation reactor according to the preparation process of the present invention were improved in terms of tensile strength, flexural strength, flexural modulus, impact strength, heat distortion temperature, and pencil hardness as compared with the bio-based polycarbonate esters of Comparative Examples 1 and 2 prepared by using the low-viscosity vertical alignment polycondensation reactor since the former had a higher molecular weight than that of the latter.

In particular, it was confirmed that the impact strength of Examples 1 and 2 was significantly increased relative to the increase in tensile strength and flexural strength as compared with Comparative Examples 1 and 2, which had the same content of DPCD, by virtue of the increase in molecular weight. In addition, the heat distortion temperature and pencil hardness were also increased due to the increase in the molecular weight.

In addition, the tensile strength and impact strength were increased, while the glass transition temperature, heat distortion temperature, and flexural strength were decreased, as the content of DPCD was increased (Examples 1 to 5). In particular, Examples 4 and 5 showed that the impact strength reached no breakage. As a result, the compositions of Examples 4 and 5 had a heat resistance and an impact strength equal to, or higher than, those of a BPA polycarbonate.

Further, Example 6 used DPT, and Example 7 used DPCD and DPT together. It was confirmed that the heat resistance was higher than that of Examples 1 and 2, while other physical properties were similar.

Meanwhile, the impact strength in Comparative Examples 1 and 2 prepared by using the low-viscosity vertical arrangement polycondensation reactor was significantly low due to the low molecular weight.

Therefore, the present invention can produce a high-molecular weight, bio-based polycarbonate ester having an intrinsic viscosity (IV) of 1.0 dl/g or more by using a high-viscosity polycondensation reactor. The bio-based polycarbonate ester thus prepared is excellent in heat resistance, transparency, and mechanical properties. Thus, it can be advantageously used in various applications.

The invention claimed is:

1. A process for preparing a polycarbonate ester, which comprises:
   feeding a monomer mixture comprising (i) at least one compound selected from the group consisting of compounds of the following Formulae 1 and 3; (ii) a compound of the following Formula 2; and (iii) a 1,4:3,6-dianhydrohexitol to a reactor comprising one or more stirrers, said reactor being an extruder, a kneader, or a finisher reactor;
   melting the monomer mixture and reacting the monomer mixture at a reduced pressure to prepare a polycarbonate prepolymer; and
   further reacting the polycarbonate prepolymer at a reduced pressure to prepare the polycarbonate ester;
   wherein the polycarbonate prepolymer has an intrinsic viscosity (IV) of 0.10 to 0.60 dl/g:

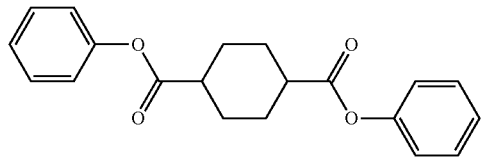
[Formula 1]

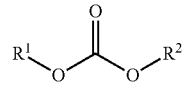
[Formula 2]

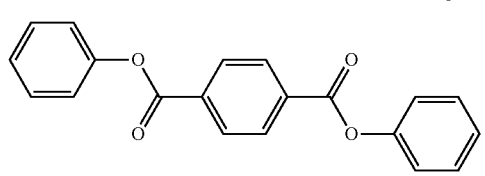
[Formula 3]

wherein in Formula 2, $R^1$ and $R^2$ are each an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent; and the ester substituent may be an alkyl ester having 1 to 18 carbon atoms, a cycloalkyl ester having 4 to 20 carbon atoms, or an aryl ester having 6 to 18 carbon atoms, wherein the polycarbonate ester has an intrinsic viscosity (IV) of 0.8 to 2.3 dl/g, and wherein a specimen injection-molded according to ASTM D638 test method from the polycarbonate ester has a tensile strength of 80 to 200 MPa and a flexural strength of 100 to 210 MPa.

2. The process of claim 1, wherein the step of melting is carried out at 20 to 700 mbar and 140 to 220° C.

3. The process of claim 1, wherein the step of further reacting is carried out at 0.1 to 20 mbar and 220 to 270° C.

4. The process of claim 1, wherein polycarbonate ester has an Izod notch impact strength of 60 J/m to no breakage.

* * * * *